A. C. STANSILL, C. H. DOTY & F. W. HUBBARD.
DUMP CAR LOCK.
APPLICATION FILED AUG. 6, 1909.
973,229.
Patented Oct. 18, 1910.
3 SHEETS—SHEET 1.
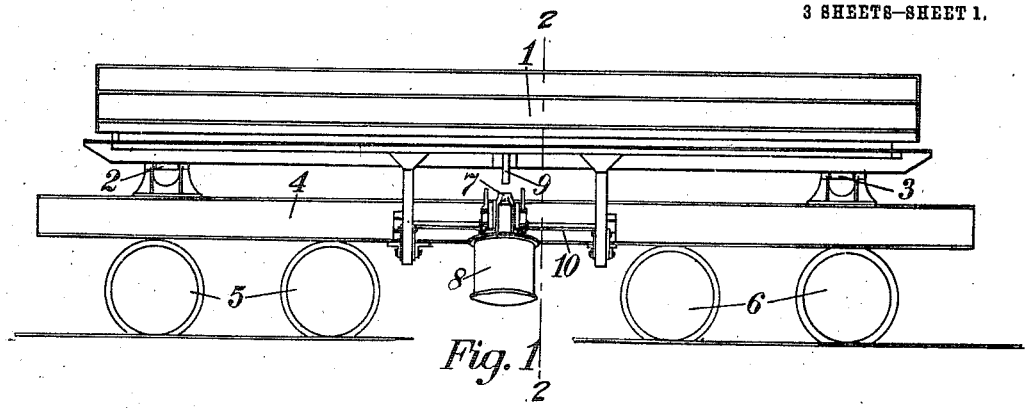
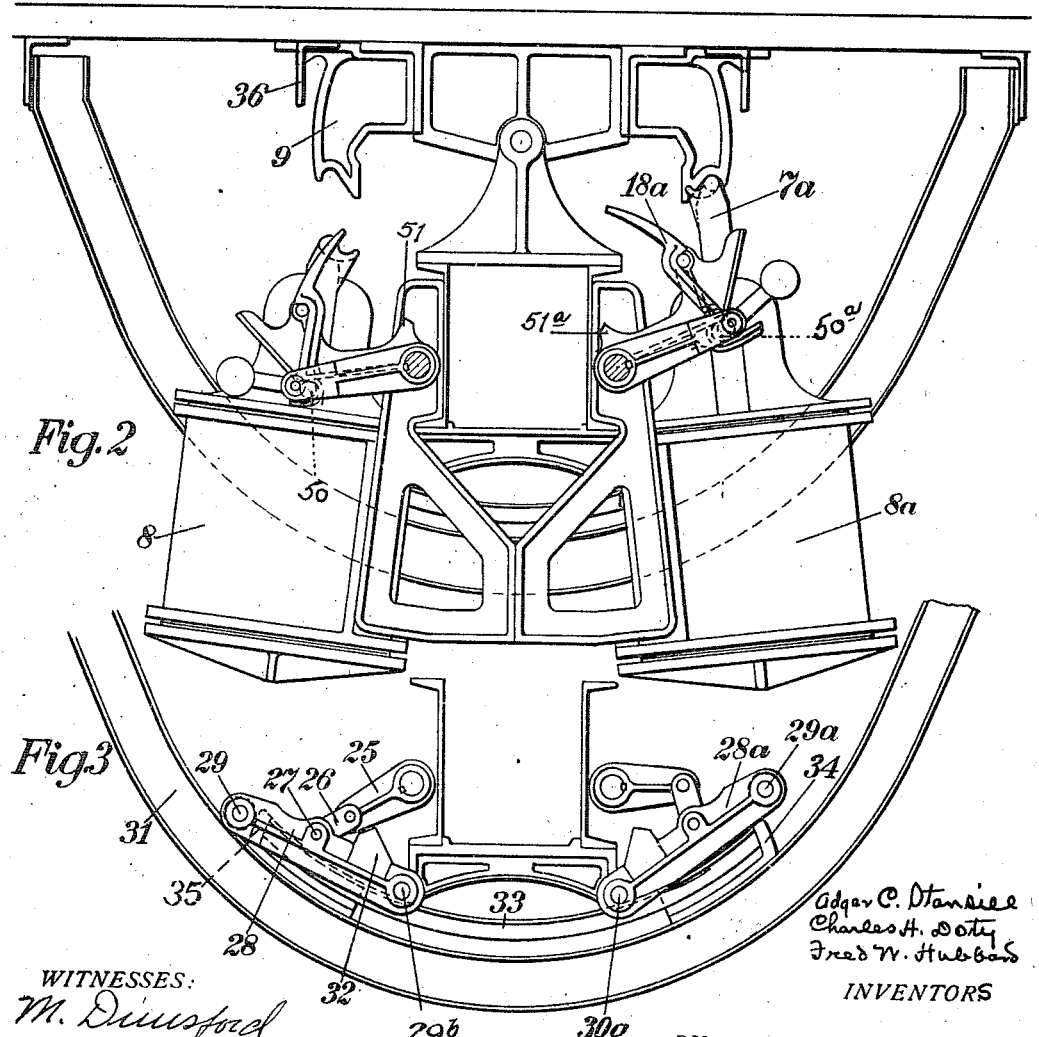
WITNESSES:
INVENTORS
Adger C. Stansill
Charles H. Doty
Fred W. Hubbard
BY Geo. W. Rightmire
ATTORNEY.

A. C. STANSILL, C. H. DOTY & F. W. HUBBARD.
DUMP CAR LOCK.
APPLICATION FILED AUG. 6, 1909.

973,229.

Patented Oct. 18, 1910.
3 SHEETS—SHEET 2.

WITNESSES:
M. Dunsford
W. Pager

Adger C. Stansill
Charles H. Doty
Fred W. Hubbard
INVENTORS

BY Geo. W. Rightmine
ATTORNEY.

A. C. STANSILL, C. H. DOTY & F. W. HUBBARD.
DUMP CAR LOCK.
APPLICATION FILED AUG. 6, 1909.

973,229.

Patented Oct. 18, 1910.
3 SHEETS—SHEET 3.

UNITED STATES PATENT OFFICE.

ADGER C. STANSILL, CHARLES H. DOTY, AND FRED WHITON HUBBARD, OF COLUMBUS, OHIO, ASSIGNORS TO THE KILBOURNE AND JACOBS MANUFACTURING COMPANY, OF COLUMBUS, OHIO, A CORPORATION OF OHIO.

DUMP-CAR LOCK.

973,229.  Specification of Letters Patent.  Patented Oct. 18, 1910.

Application filed August 6, 1909. Serial No. 511,662.

*To all whom it may concern:*

Be it known that we, ADGER C. STANSILL, CHARLES H. DOTY, and FRED WHITON HUBBARD, citizens of the United States, residing at Columbus, in the county of Franklin and State of Ohio, have invented certain new and useful Improvements in Dump-Car Locks, of which the following is a specification.

This invention relates to improvements in the means for locking and controlling a dump car, which is preferably mounted on a longitudinal axis to dump laterally, and the embodiment of the invention herein illustrated and described is applied to a dump car of this nature.

The invention consists essentially in an arc-shaped band or member applied to the underside of the car bed or body, preferably in the region of the middle of the length of the car, and with this band is associated a locking member, which is preferably provided in pairs, one located on each side of the center sill of the car; with this locking construction there is associated further locking means adapted for operation by the dumping means and also the car bed to unlock the same or maintain the same in locked position, as may be determined by the direction of movement of the car body in being dumped. Therefore, this improvement consists in associating with the dumping means of the car, locking members, controlling means for the locking members, and providing upon the bed of the car a member for unlocking the said controlling means as may be desired or required by the operation of the car. However, a similar arc-shaped member and locking devices may be arranged on a hand operated car to be manually released and controlled, and in this construction pneumatic means for dumping and righting the car are dispensed with, and the controlling means connecting the dumping means with the locks are also dispensed with. The detailed description of the devices will be hereinafter set forth.

Figure 4:
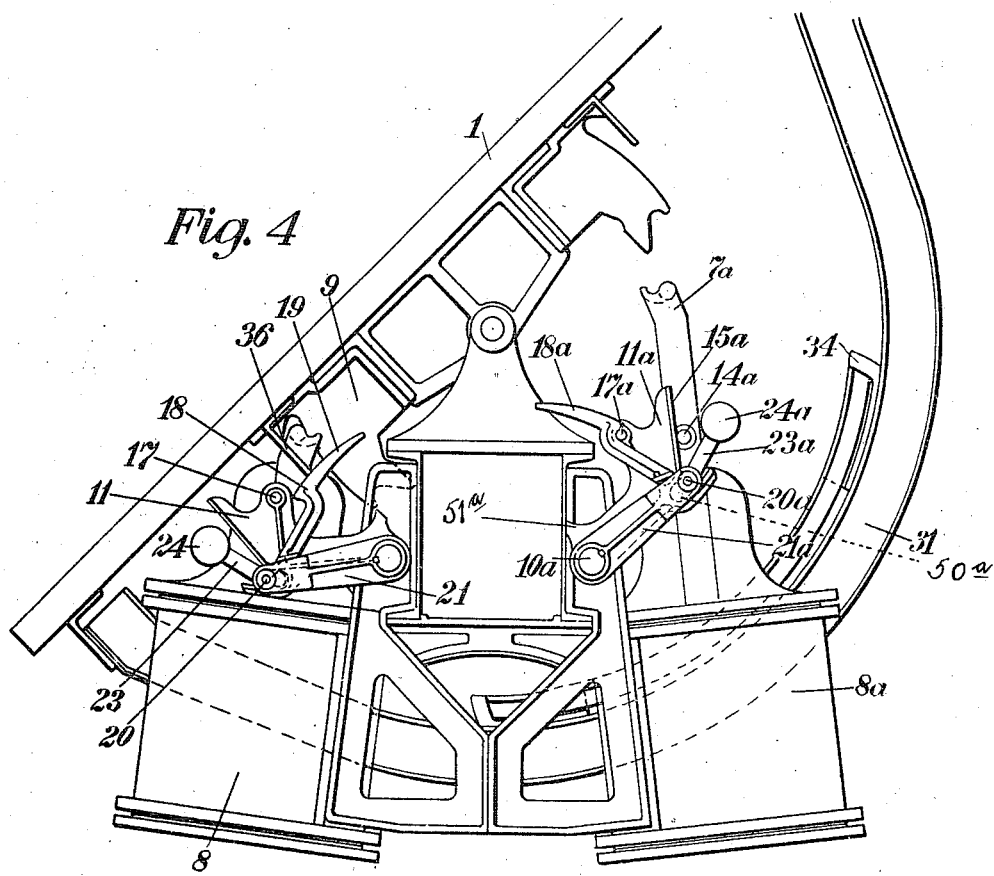
Figure 5:
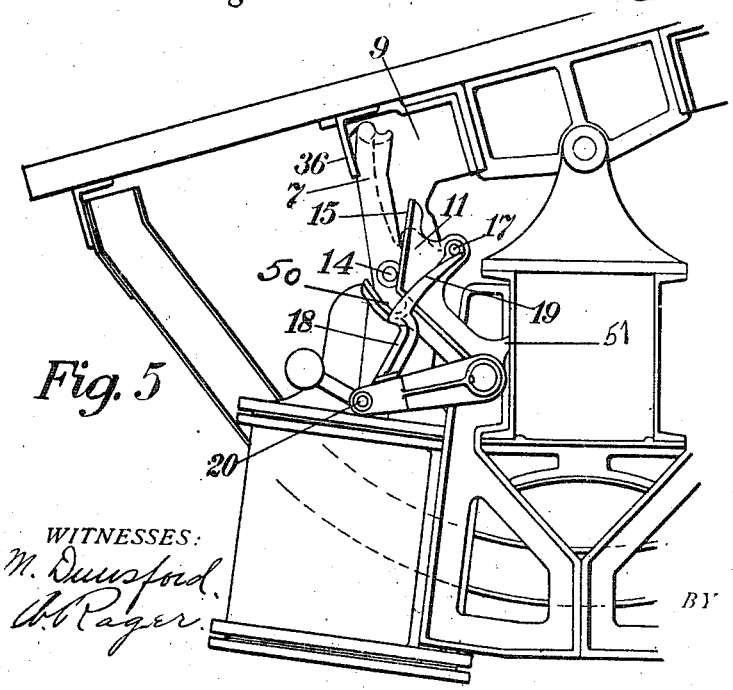
Figure 6:
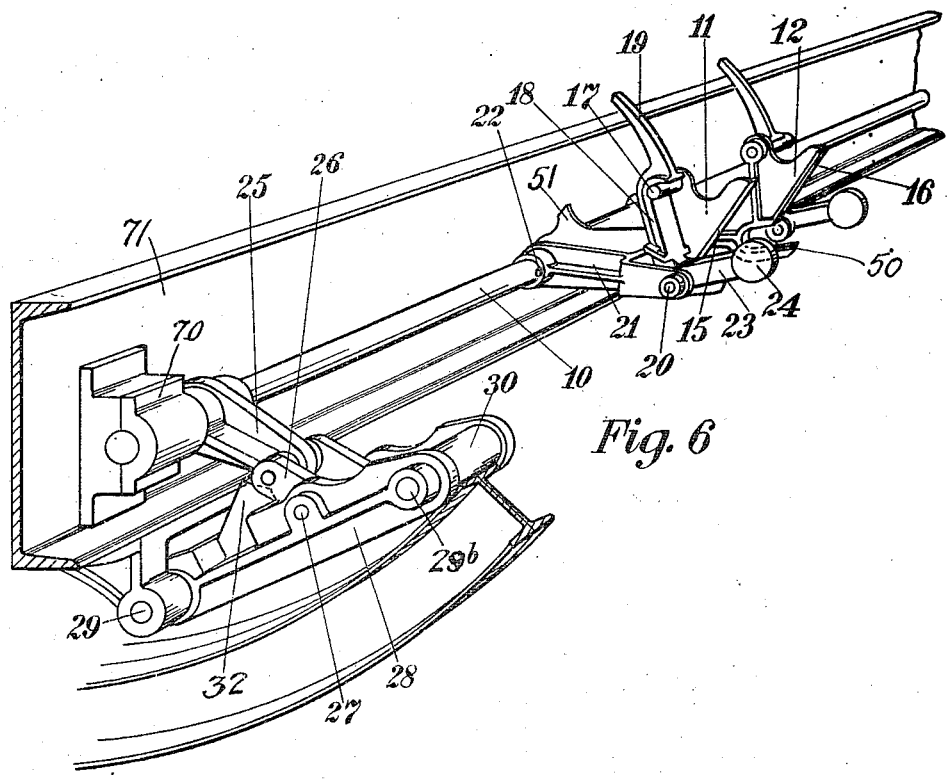

In the drawings which accompany this specification, and which are made a part hereof, Figure 1 is a side elevation of the car showing the operating means in place; Fig. 2 is a vertical transverse section through the car along the line 2—2 of Fig. 1; Fig. 3 is an end view of the locking device, the lock on each side being in the position determined by the position of the controlling members in Fig. 2 respectively; Fig. 4 is an end view showing the car dumped toward the left; Fig. 5 shows the controlling construction on the left hand side as appears in Fig. 4, except that the piston arm is engaged in righting the car, being the next movement of parts desired after the position shown in Fig. 4 has been reached; Fig. 6 is a perspective of the operating parts of the car detached therefrom and shown mounted on the operating shaft.

Various methods of locking dump cars and of controlling the dumping of the same have hitherto been in use, but this invention aims at providing positive locking and checking means for the car bed when being dumped or righted; also, positive controlling latches or triggers are arranged to be unlocked by a member carried on the car bed on the side of the car toward which the car bed is dumped, and arranged to be kept in locked or latched condition on the side of the car which is elevated in the dumping operation. In case of a hand operated car, of course, the controlling latches or triggers are dispensed with and the lock is manually operated; in any construction embodying the use of the lock herein illustrated and described, it will be seen that in case the car is overloaded on the side which is to be elevated in the dumping operation, when the lock on that side is released the car bed will be held in its normal position by the lock on the opposite side of the car which remains in engagement with the band or arc-shaped member. Therefore, the car bed is held in normal position by one lock while the other is released to permit the force which is applied to the car bed to dump it in the proper direction. A car bed overloaded on one side could not be controlled if there were only one lock centrally or otherwise arranged, after the lock has been released, and such control is made possible by the construction herein shown, which embodies not only a simple device but one of great utility.

Much danger and disaster have hitherto been experienced in using dump cars, on account of their tendency to become unlocked in transportation, when an accident to one car has been responsible for the wreck of the train, and the loss of human life. Delay in traffic also frequently results therefrom, and experience has shown the great value of any improvement in this art which tends to render the locking and the unlocking positive operations not capable of performance before all conditions are proper.

Our improvements make the car safe to handle in loading, in unloading, and during transportation, and constitute a distinct and practical advance in this art.

Especial emphasis is laid upon the fact that the car is positively locked while in carrying position, and the air cylinders which dump the car can not be operated for that purpose until the proper lock member has been first unlocked, and the dumping of the car itself is adapted to set the lock on the opposite side of the car in such position as to positively engage the locking arc-shaped band when the car is restored to its normal position.

In the drawings, 1 indicates the bed of the dump car mounted to dump laterally on the pivots 2 and 3 supported on the underframe 4 of the car, the underframe being mounted upon the trucks 5 and 6 which latter are shown conventionally. The dumping of the car is effected by a piston arm 7 actuated from an air cylinder 8, to which air is admitted appropriately from the train pipe in a manner which need not be here shown or described, as it will be understood. The piston arm when lifted is adapted to engage a bracket member 9 mounted on the car bed and positioned appropriately for this engagement.

A short shaft 10 is mounted in appropriate bearings on the underframe of the car; as shown in Fig. 6 a bracket 70 is provided on center sill 71, and this bracket furnishes a bearing for the shaft 10 at one end; a similar bracket is provided for a bearing for the opposite end of shaft 10. Said shaft 10 has loosely mounted thereon the cam member 11 which is preferably provided in pairs, 11, 12, between which extends the vertical piston arm 7 carrying thereon the laterally extending pins one being shown at 14 adapted for contact with the faces 15, 16 of the cam members 11, 12. It is seen that when the piston arm is lifted the effect of this construction is to rotate the members 11 and 12 on the shaft 10 as a pivot, and therefore by this action the shaft is in no wise operated. To provide for the operation of the shaft, a pin 17 is provided on each of the members 11, 12, (see Fig. 6), and over this pin engages a latch member 18 which is provided with the cam face 19; the latch member 18 is pivoted at 20, on a crank arm 21 keyed at 22 on the shaft 10. The latch 18 is formed with the extending arm 23 weighted by the ball or enlargement 24 to maintain the engagement of the latch with the cam member and to return the latch to normal position when by any means it has been carried out of position. It is seen that the upward movement of the piston arm 7 will set up rotary motion in the cam members 11 and 12 which will carry the latch 18 upwardly, thereby rotating the shaft 10 through the crank arm 21. The effect of this rotation of the shaft is seen by reference to Fig. 6, in which a crank arm 25 is shown keyed at the end of the shaft 10 and associated therewith is the pivoted link member 26, which is connected at 27 with the locking member 28. This locking member carries at its ends rollers one being shown at 30, which are journaled at 29 and $29^b$ at the ends of locking members 28, (see Fig. 6) and which rotate in engagement with the arc member or locking band 31 as appears especially in Fig. 3. The locking member 28 (see Fig. 3) hangs by the pivot 27 on the link 26 which is in turn pivoted to rock arm 25; the rear roller abuts against the bracket on the lower side of the center sill, but is not connected thereto. Locking member 28 is provided with a projection 32 serving as a stop for the crank arm 25, (see Figs. 3 and 6) thereby preventing said arm from swinging too far downwardly. The cam members 11, 12 are slotted at 50, $50^a$, to receive the pins 13, 14; when the piston arm 7 returns to normal position after the car is dumped, the pins 13, 14, engage the lower, protruding wall of the slot and thereby carry down the cam members positively, to their normal position. The cam members are prevented from being tilted unduly by the cross pins 13, 14, when the piston arm is lifted, by the lugs or shoulders 51, $51^a$ formed thereon, which engage the center sill of the car and are thereby stopped. Safety and positiveness of operation are thereby assured.

The locking band 31 is provided with the member 33 which terminates in the inclined ends 34 and 35, and referring to Fig. 3, the end 35 is seen to engage the roller journaled at 29 of the lock member 28, and in that position the car is locked against dumping toward the right, whereas on the opposite side of the car in said Fig. 3, it is seen that the lock has been lifted out of engagement with the end 34 and therefore the car is free to be dumped toward the left. The locking and controlling devices on the opposite sides of the car are similarly constructed and it is not deemed essential to describe in detail the various sets of locking and controlling devices.

Referring to Fig. 4, the operation of the piston arm $7^a$ is clearly seen; the pin $14^a$ thereon is seen to be in engagement with the cam face $15^a$ of the cam member $11^a$, and the latch member $18^a$ is seen to be in engagement with the pin $17^a$. The weight or ball is shown at $24^a$ carried on the extension $23^a$ of the latch 18ᵃ pivoted at 20ᵃ on the crank arm 21ᵃ keyed on the shaft 10ᵃ. The locking band or arc-shaped member is shown at 31. It is seen that the upward travel of the piston arm 7ᵃ does not move the cam member 11ᵃ and therefore does not disturb the position of the shaft 10ᵃ and consequently the lock member 28ᵃ on that side of the car as seen in Fig. 3, is not lifted from the position shown in said Fig. 3, in which it is apparent that the locking member is lifted out of engagement with the inclined end 34 of the member 33. In Fig. 3, the position of the lock 28ᵃ is effected by the movement of the piston arm 7ᵃ delineated in Fig. 2, the position of said arm 7ᵃ in Fig. 4 being the maximum elevation of said arm, after the dumping impetus has been imparted to the car bed or body 1. Therefore the unlocking of the lock 28ᵃ is effected by the initial movement of the piston arm 7ᵃ actuated from the air cylinder 8ᵃ. On the opposite side of the car the position of parts during the operations just described is shown progressively in Figs. 2, 3, 4 and 5, in which a plate or depending member 36 is shown, mounted near the bracket 9. In Fig. 2, the devices mounted on the left hand side of the car are shown also in normal position, which is maintained so long as the parts shown in Fig. 2 are undisturbed. In Fig. 4 the dumping operation is shown as completed; the plate member 36 is in engagement with the face 19 of the latch 18, thereby moving said latch out of its locking engagement with the pin 17 mounted on the cam member 11, which is accomplished by rotating the said latch on its pivot 20. As described, above, this rotation of the latch 18 takes place without in any manner affecting the position of the lock 28. In Fig. 5 the piston arm 7 is shown in engagement with the bracket member 9 and the pin 14 is moving upwardly along the cam face 15 of the member 11, and the pin 17 thereon is in engagement with the cam face 19 of the latch 18, which engagement is just about to take place in the position of parts shown in Fig. 4. The cam member 11 is therefore released from the latch 18 and is free to rotate on the shaft, while the latch member is also free to rotate on its pivot 20 and consequently the position of the lock 28 during the entire dumping and righting of the car shown in these drawings is in no wise affected. Accordingly, when the car is righted by action of the piston arm 7, the lock 28 remains in such position that the inclined end 35 of the member 24 carried on the locking band 31 engages the roller journaled at 29 and is thereby held against further movement. Accordingly, the car bed comes to rest in its normal position by virtue of the lock 28 maintaining its position as just described.

When the piston arm 7ᵃ reaches the position shown in Fig. 4, the air is cut off from admission to the cylinder 8ᵃ and the piston gradually settles back in the cylinder; as this movement takes place, the pin 14ᵃ gradually moves off of the face 15ᵃ of the cam member 11ᵃ and thereby the said cam member is free to drop to its normal position, carrying the latch member 18ᵃ therewith, and thereby restoring the lock 28ᵃ to its normal position. Consequently, when the car is righted through the described operation of the piston arm 7, the member 33 passes beneath the rollers journaled at 29ᵃ and 30ᵃ until the inclined end 34 has passed the roller journaled at 29ᵃ, which on account of the link support for the lock 28ᵃ will drop downwardly and engage the end 34, thereby locking the car positively against an unpremeditated dumping movement toward the left.

It is seen from the foregoing description that the lock on each side of the car is mounted and connected and controlled in such manner that it is lifted from or maintains its locking position, as desired, the lock being lifted on the side of the car which is to be elevated in the dumping operation, and being left in its normal position on the opposite side of the car. By the means described a positive lock is provided for the car, arranged preferably at a point near the longitudinal center of the car where it can be easily placed, and repaired if need be, and where the least possible strain is developed in the locking members by the dumping operation of the car. The operation of the various devices provided is controlled entirely from the engine by controlling the supply of air to the cylinders, and may therefore in the construction just described, be said to be automatic. One or more locking bands or arc-shaped members may be provided as desired. In a hand dump car, the locks have the same function, exercised in the same manner, but the piston and connections are eliminated.

Modifications of the features here shown may be made and this invention is not therefore limited to the specific construction shown but is to be construed in accordance with the scope of the appended claims.

What I claim is:

1. In a dump car, a band secured thereto and depending therefrom, dumping means, a shaft mounted on said car, a rocker arm on said shaft, a lock adapted to engage said band carried by said rocker arm, and a controlling member for said shaft adapted to be operated by said dumping means to release said lock when the car is dumped.

2. In a dump car, a band secured thereto and depending therefrom, dumping means, a shaft mounted on said car, a rocker arm on said shaft, a lock adapted to engage said band carried by said rocker arm, a cam member loosely mounted on said shaft, a latch rigidly borne on said shaft to engage said cam member, said dumping means being adapted to engage said cam member to release said lock when the car is dumped.

3. In a dump car, a band secured thereto and depending therefrom, a lug on said band, a lock adapted to engage said lug, controlling means for said lock, and dumping means for said car connected with said controlling means and adapted to actuate said controlling means to release said lock when the car is dumped.

4. In a dump car, a band secured thereto and depending therefrom, a lug on said band, a lock on one side of said car adapted to engage said lug, controlling means for said lock, dumping means for said car adapted to actuate said controlling means to release said lock when the car is dumped, a similar lock, lug, and controlling means on the opposite side of said car, and a member carried by said car adapted to render said controlling means on said opposite side of the car inoperative when the car is in its dumped position.

5. In a dump car, a locking band secured thereto having a lug thereon, a lock on one side of said car adapted to engage said lug, a shaft adapted to operate said lock, a cam member loosely mounted on said shaft, a latch member carried by said shaft for said cam member, dumping means adapted to engage said cam member to release said lock when the car is dumped, a similar lug, lock, shaft, cam, and latch means arranged on the opposite side of the car, and a member carried by said car to disengage said latch on the side of the car toward which the dumping operation takes place.

In testimony whereof we affix our signatures in the presence of two witnesses.

ADGER C. STANSILL.
CHARLES H. DOTY.
FRED WHITON HUBBARD.

Witnesses:
GEO. W. RIGHTMIRE,
J. D. POTTER.